(12) United States Patent
Ptacek et al.

(10) Patent No.: US 12,405,372 B2
(45) Date of Patent: Sep. 2, 2025

(54) SMART RADAR ALTIMETER BEAM CONTROL AND PROCESSING USING SURFACE DATABASE

(71) Applicant: Honeywell International Inc., Charlotte, NC (US)

(72) Inventors: Pavel Ptacek, Rosice (CZ); Petr Kejik, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 386 days.

(21) Appl. No.: 18/049,155

(22) Filed: Oct. 24, 2022

(65) Prior Publication Data

US 2024/0134040 A1   Apr. 25, 2024
US 2024/0230890 A9   Jul. 11, 2024

(51) Int. Cl.
| | |
|---|---|
| G01S 13/935 | (2020.01) |
| G01S 13/42 | (2006.01) |
| G01S 13/88 | (2006.01) |

(52) U.S. Cl.
CPC .......... G01S 13/935 (2020.01); G01S 13/426 (2013.01); G01S 13/882 (2013.01)

(58) Field of Classification Search
CPC .... G01S 13/935; G01S 13/426; G01S 13/882; G01S 13/48; G01S 13/60; G01S 7/2813; G01S 7/292; G01S 7/354; G01S 7/414
See application file for complete search history.

(56) References Cited

U.S. PATENT DOCUMENTS 5,892,462 A * 4/1999 Tran ............... G05D 1/0646
                                                  340/961
6,233,522 B1   5/2001 Morici
(Continued)

FOREIGN PATENT DOCUMENTS

EP   3054314 A1   8/2016
EP   3054316 A1   8/2016

OTHER PUBLICATIONS

European Patent Office, "Extended European Search Report", dated Feb. 23, 2024, from EP Application No. 232011496.9, from Foreign Counterpart to U.S. Appl. No. 18/049,155, pp. 1 through 14, Published: EP.

*Primary Examiner* — Vladimir Magloire
*Assistant Examiner* — Anna K. Gosling
(74) *Attorney, Agent, or Firm* — Fogg & Powers LLC

(57) ABSTRACT

A system comprises a vehicle radar sensor including an antenna, transmitter, receiver, and processor. The processor hosts a scanning control module that sends a control signal to the transmitter, receiver, or both, to generate radar beams; and a signal processing module that receives a reflected signal from the receiver to generate radar data. The system also includes an onboard application module and ground surface database. The application module is operative to access information from the surface database, access position and attitude data, access position and attitude uncertainty data, access radar installation data, and access radar data from the signal processing module; identify ground surface areas to be avoided based on the information from the surface database, the position and attitude, the position and attitude uncertainty, and the radar installation data; and perform modified radar operations and/or processing when the ground surface areas to be avoided are within a radar FOV.

20 Claims, 6 Drawing Sheets

(56) References Cited

U.S. PATENT DOCUMENTS

| | | |
|---|---|---|
| 6,690,317 B2 | 2/2004 | Szeto et al. |
| 7,808,422 B1 | 10/2010 | Woodell et al. |
| 8,077,078 B1 | 12/2011 | Woodell et al. |
| 8,160,758 B2 | 4/2012 | Call et al. |
| 8,509,965 B2 * | 8/2013 | Lin .................. G08G 5/80 |
| | | 340/961 |
| 8,788,128 B1 * | 7/2014 | McCusker ............ G01S 13/882 |
| | | 701/4 |
| 9,007,254 B2 | 4/2015 | Vangen et al. |
| 9,091,759 B1 | 7/2015 | Sishtla et al. |
| 9,110,170 B1 | 8/2015 | Woollard et al. |
| 9,274,222 B1 | 3/2016 | Schmalenberg et al. |
| 10,228,460 B1 * | 3/2019 | Jinkins .................. G01S 7/24 |
| 10,823,820 B2 | 11/2020 | Yamada et al. |
| 10,877,150 B2 | 12/2020 | Badin et al. |
| 10,914,830 B2 | 2/2021 | Vacanti et al. |
| 10,955,548 B1 | 3/2021 | Jinkins et al. |
| 10,989,802 B2 | 4/2021 | Pos et al. |
| 11,143,756 B2 | 10/2021 | Vacanti |
| 2012/0314032 A1 | 12/2012 | Muensterer et al. |
| 2019/0086527 A1 * | 3/2019 | Larson .................. G01S 13/02 |
| 2019/0086534 A1 | 3/2019 | Frick et al. |
| 2019/0113610 A1 | 4/2019 | Vacanti et al. |
| 2020/0341132 A1 | 10/2020 | Holt et al. |
| 2021/0027639 A1 * | 1/2021 | Rose .................. G01S 19/15 |
| 2021/0132220 A1 | 5/2021 | Badin et al. |
| 2022/0128354 A1 | 4/2022 | Teague et al. |

* cited by examiner

FIG. 5A
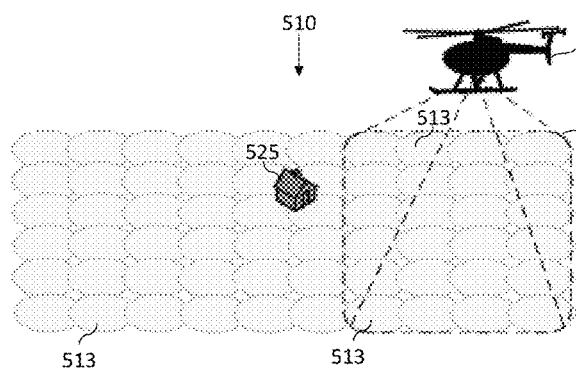
FIG. 5B
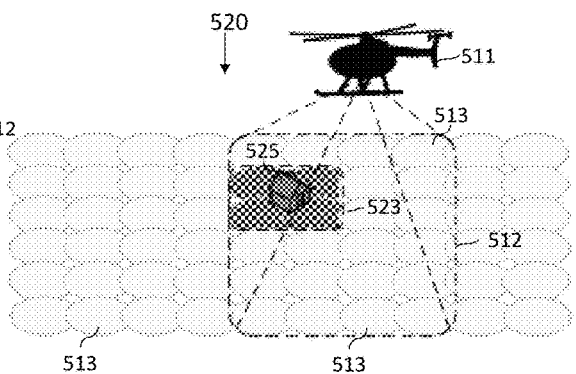
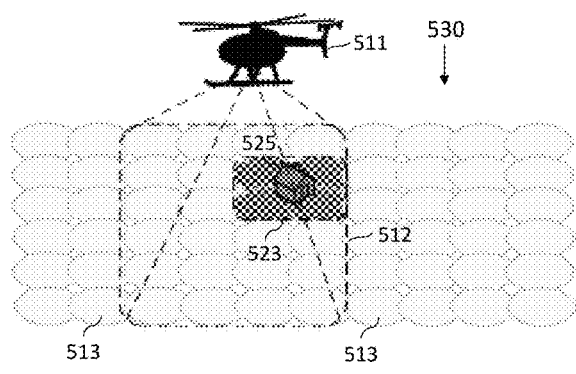
FIG. 5C
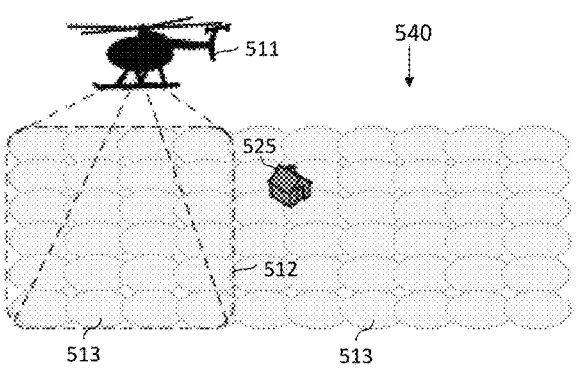
FIG. 5D

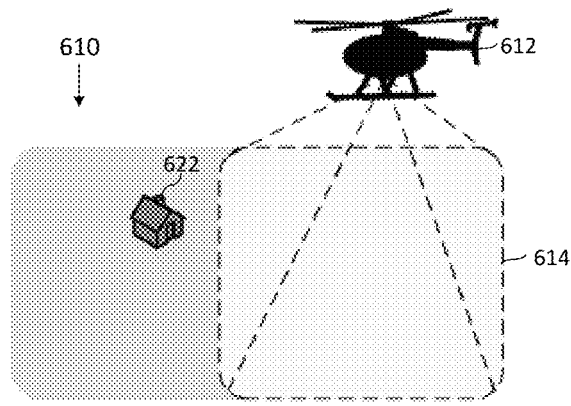 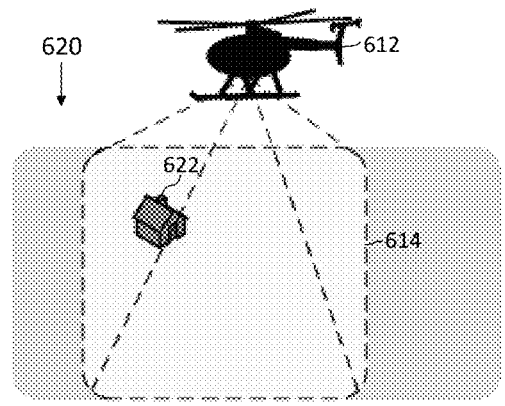
FIG. 6A                                   FIG. 6B
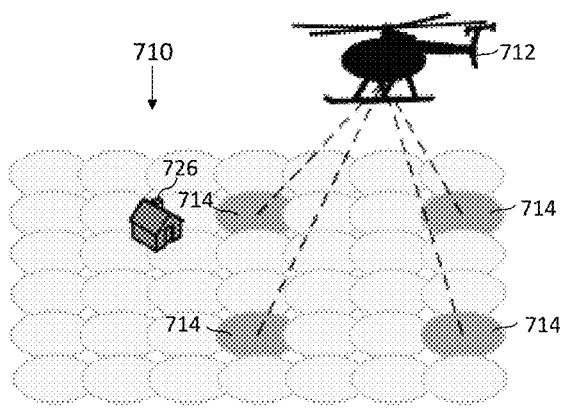 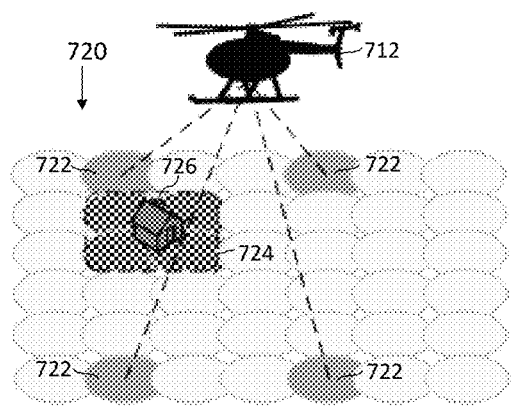
FIG. 7A                                   FIG. 7B

SMART RADAR ALTIMETER BEAM CONTROL AND PROCESSING USING SURFACE DATABASE

BACKGROUND

Radar systems may be used by aircraft, ground installations, or other vehicles to detect weather, other aircraft, or other objects in the surrounding space. There are various conventional approaches that use a radar and terrain database for terrain-aided navigation purposes, such as correlating radar data and the database, vehicle position validation, and the like.

A radar altimeter measures the altitude above the terrain presently beneath a vehicle such as an aircraft by timing how long it takes a beam of radio waves to travel to the ground, reflect, and return to the vehicle. The radar altimeter provides the distance between the radar antenna and the ground directly below.

A problem with typical radar altimeter measurements is that radio reflections from surfaces such as buildings, shelters, houses, tree clusters, forests, complex structures, and the like, increase the errors in radio altitude (including altitude jumps), and reduce repeatability of range error statistics due to these objects including seasonal variations of natural features (e.g., trees/forest). This leads to reduced reliability of measurements that are critical for any approach and landing applications for aircraft.

SUMMARY

A system comprises a radar sensor unit onboard a vehicle, with the radar sensor unit comprising at least one antenna; a transmitter operatively coupled to the at least one antenna, the transmitter configured to transmit one or more radar beams toward a surface through the at least one antenna; a receiver operatively coupled to the at least one antenna, the receiver configured to receive a reflected return signal of the transmitted one or more radar beams through the at least one antenna; and at least one processor unit operatively coupled to the transmitter and the receiver. The at least one processor unit hosts a plurality of modules comprising a scanning control module operative to send a control signal to the transmitter, to the receiver, or to both the transmitter and the receiver, to generate one or more radar beams; and a signal processing module configured to receive a reflected signal from the receiver to generate radar data. The system also includes an application module stored onboard the vehicle, and a ground surface database stored onboard the vehicle or at a ground location. The application module is operative to access information from the ground surface database, access position and attitude data of the vehicle, access position and attitude uncertainty data of the vehicle, access radar installation data, and access radar data from the signal processing module, identify one or more ground surface areas to be avoided based on the information from the ground surface database, the position and attitude of the vehicle, the position and attitude uncertainty of the vehicle, and the radar installation data; and perform modified radar operations and/or processing when the one or more ground surface areas to be avoided are within a radar field of view of the radar sensor unit.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 5A-5D are schematic illustrations of an exemplary radar scanning operation, using a radar sensor with narrow beam and beam steering mechanism, for which the system of FIG. 1 can be implemented;

FIGS. 6A and 6B are schematic illustrations of an exemplary radar scanning operation, using a radar sensor with wide beam and without beam steering capability, for which the system of FIG. 1 can be implemented;

FIGS. 7A and 7B are schematic illustrations of an exemplary radar scanning operation, using a radar sensor with narrow beam and beam steering mechanism for Doppler navigation, for which the system of FIG. 1 can be implemented;

DETAILED DESCRIPTION

Figure 1:
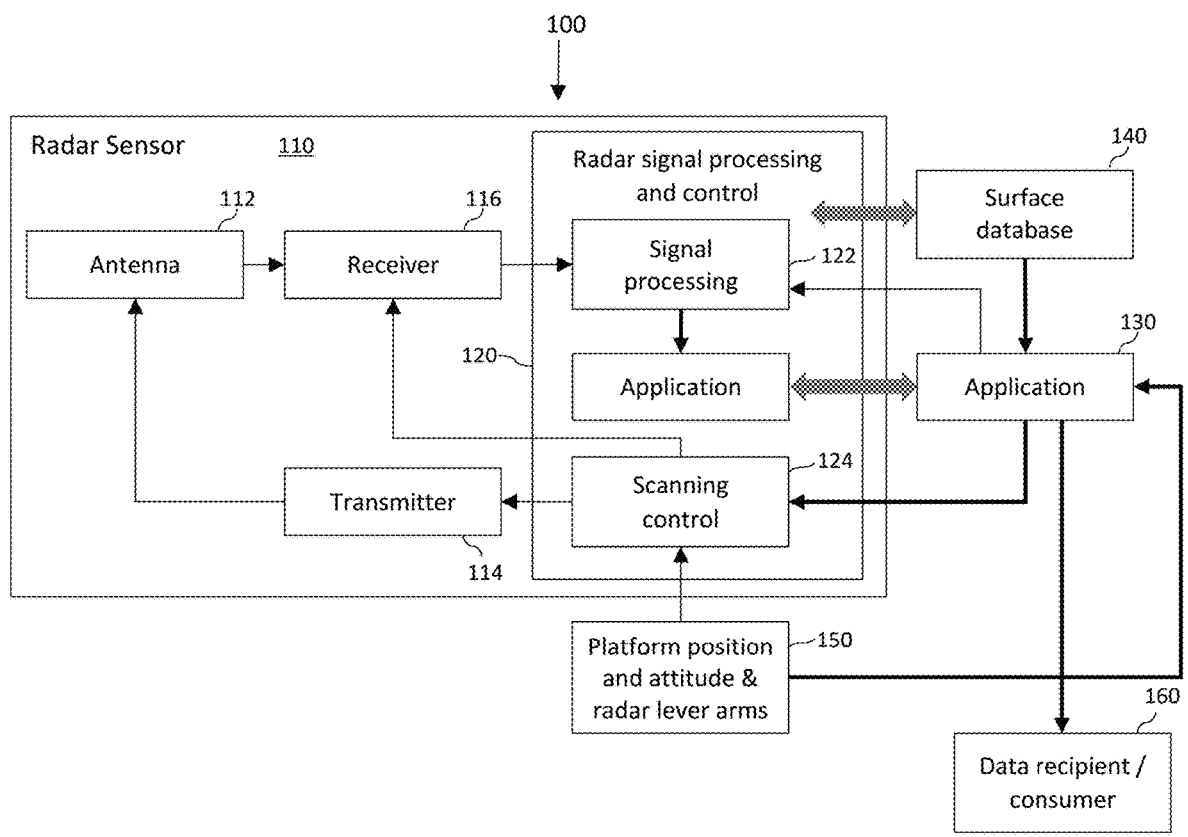
FIG. 1 is a block diagram of a system for radar altimeter beam control and/or processing, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

The present approach is directed to radar altimeter operation and/or processing extended by utilization of a surface database. In particular, systems and methods for radar altimeter beam control and/or radar data processing, using an earth surface database, are described herein. The systems and methods reduce measurement errors that emerge due to radar reflections from some specific surfaces or objects. This provides a stable radio altimeter function with high accuracy and reliability of ground altitude information when a vehicle is flying over surfaces with natural and manmade objects.

The radar altimeter operation and/or processing is extended by utilization of the surface database, which can include natural and man-made surface elements. The combination of a radar altimeter and modified beam control and/or processing, where the modified operation and/or processing is determined using the surface database, leads to improved reliability and stability of measurements that are critical for any approach and landing applications, or low altitude navigation. In addition, a stable and smooth radar-based radio altimeter function is provided for navigation hybridization/aiding to increase primary navigation solution accuracy and integrity of a vehicle navigation solution. The present approach can provide quality data that is output for navigation use.

In some embodiments, the present approach provides systems with steered antenna beams for a smart radar altimeter. These systems use earth surface database information to steer a radar beam to enable a stable and smooth radar-based radio altimeter function. This allows for applications over surfaces with natural and manmade objects by avoiding or decreasing/diluting inaccurate measurements in a target area caused by trees, buildings, and the like.

In other embodiments, the database information can be used to filter out or skip specific radar altimeter data. For example, when a normal radar scan pattern is kept, data from specific beam directions might be skipped in post processing. A combination of beam steering and post processing can also be employed.

The present methods can avoid a target/obstacle presence in radar data (e.g., to omit a solitary building or trees from altimeter measurements) to reduce altitude measurement errors. This increases reliability of navigation over such types of surface objects and allows smooth ground altitude output to ensure its further usability in applications supported by radar sensors, such as a radar altimeter, terrain-aided navigation, or velocity aiding. This also improves a process of matching the ground altitude measurement to the respective ground surface database tile, and creates a mean sea level or WGS84 ellipsoid altitude to allow further navigation use on vehicle or in external storage.

For example, information from a database can be used to skip beam directions in which ground features such as buildings, lighting poles, trees, and the like, are expected. Alternatively, data processing can be used to omit data from specific beam directions in which these ground features are present.

Quality information can be provided at the output of the system for navigation use. The objective is to provide a "smooth" altitude not impacted by ground feature obstacles, their shape, and seasonal variation of natural surface elements, by eliminating the presence of ground feature obstacles that deteriorate quality and reliability of range measurements.

A radar altimeter application can be implemented as an application only. The application can be hosted either on the radar itself, or on an external computing platform. The application has access to the platform (e.g., vehicle such as helicopter, airplane, UAV, etc.) position and attitude, as well as radar lever arms (radar installation data). The application also has access to a surface database and radar output (raw data, altitude, detections, tracks, etc.). The surface database can be hosted on the radar or on an external platform/storage. The application calculates the areas of interest and steers radar beams either inside or outside of those areas, or it uses the information for modified radar data processing.

Further details regarding the present approach are described as follows and with reference to the drawings.

FIG. 1 is a block diagram of a system 100 for radar altimeter beam control and/or processing, according to one embodiment. The system 100 includes a radar sensor 110 onboard a vehicle such as an aircraft (e.g., helicopter, unmanned aerial vehicle (UAV), urban air mobility (UAM) vehicle, etc.). The radar sensor 110 generally comprises at least one antenna 112, a transmitter 114 operatively coupled to antenna 112, and a receiver 116 operatively coupled to antenna 112.

The antenna 112 can be implemented for transmitting and receiving, as an antenna array, or the like. In addition, antenna 112 can be implemented with a beam steering capability, or with a fixed beam direction. The beam-steering capability can be implemented using electronically steered antenna array(s), mechanically steered antenna(s), or a combination of both. The beam-steering capability can be implemented for transmitter (transmitting antenna), receiver (receiving antenna), or both (if applicable). Antenna steering (beam control) can include specification of individual beam direction(s), specification of a desired field of view (FOV), or a combination of both. Smart beam steering can be used to either avoid or concentrate radar beams on one or more specific areas.

The radar sensor 110 also includes at least one processor unit (e.g., a digital signal processor (DSP), a generic purpose processor (GPP), etc.), which includes radar signal processing and control module 120 that is operative to perform radar signal/data processing and radar control. The radar signal processing and control module 120 hosts a radar signal processing module 122 configured to receive a signal from receiver 116 and to process the signal. This signal processing can include filtering, thresholding, forming radar images, identification and tracking of targets, or the like. The radar signal processing module 122 can be configured to output raw radar data, radar detection signals, tracks, or any other radar output data. The radar signal processing and control module 120 also hosts a scanning control module 124 operative to send a control signal to transmitter 114, receiver 116, or both, to control radar scanning (e.g., beam steering, if applicable). The radar signal processing and control module 120 also hosts other control units (not depicted in FIG. 1) necessary to ensure overall radar functionality (e.g., radar waveform definition and control, etc.). The radar sensor 110 may be configured to operate in different frequency bands (e.g., C, X, K, Ku, Ka).

An application module 130 can be hosted on radar sensor 110, such as in radar signal processing and control module 120, or can be hosted on an external computing platform onboard the vehicle. Alternatively, application module 130 can be distributed to both radar sensor 110 and the external computing platform. The application module 130 can include a radar altimeter application, a Doppler navigation application, a terrain aided navigation application, or other similar application.

A surface database 140 can be hosted on radar sensor 110, such as in radar signal processing and control module 120, or can be hosted on an external computing platform or storage onboard the vehicle. Alternatively, surface database 140 can be distributed to both radar sensor 110 and the external computing platform/storage. The surface database 140 provides all earth surface elements including, for example, manmade objects, shapes and altitudes of all natural elements, and expected measurement quality information per database tile.

The application module 130 has access to information from surface database 140, and to radar output data (e.g., raw data, altitude, detections, tracks, etc.) from radar signal processing module 122. The application module 130 also has access to platform data 150 including position and attitude, for the vehicle, and radar installation data (radar lever arms), with respect to the vehicle. The application module 130 processes radar data provided by radar signal processing module 122, using the information from surface database 140 and platform data 150. An output signal from application module 130 can be sent to a data recipient/consumer 160, such as a display, indicator, or the like.

During operation, transmitter 114 sends a radio signal to antenna 112 for transmission of the radio signal (radar beam)

toward the ground. The antenna 112 receives a reflected signal from the ground that is sent to receiver 116. The received reflected signal is converted to a digital signal and sent to radar signal processing module 122 for generating radar data. The application module 130 is operative to calculate one or more areas of interest based on platform data 150 including radar installation data (radar lever arms), and information from surface database 140. The application module 130 then outputs a control signal to scanning control module 124, which steers the radar beam (transmitter beam direction, receiver beam direction, or both) either inside or outside of the areas of interest. The application module 130 can also use the information on the areas of interest for modified radar data processing, which might comprise modified signal processing by radar signal processing module 122 (e.g., modified thresholding), modified processing within application 130 (e.g., specific data omitting), or both. The application module 130 can perform standard radar data processing and can also perform extra data processing according to the present approach, such as illustrated in FIG. 2, which is described hereafter.

In another embodiment, the surface database or elements thereof, can be hosted and maintained at a ground location such as in a ground station. For example, a ground-based surface database can be used for unmanned vehicle operations, such as where a ground station supports UAV operations. In this scenario, when a UAV is approaching a landing zone and there will be new obstacles located on the ground along the approach path, the ground station can send this new change in database information representing the new obstacles to the UAV. The UAV would then consider this in selection of an obstacle-free space location using position, attitude and their uncertainties, as the originally free space can now be occupied with the obstacles and thus need to be avoided.

Figure 2:
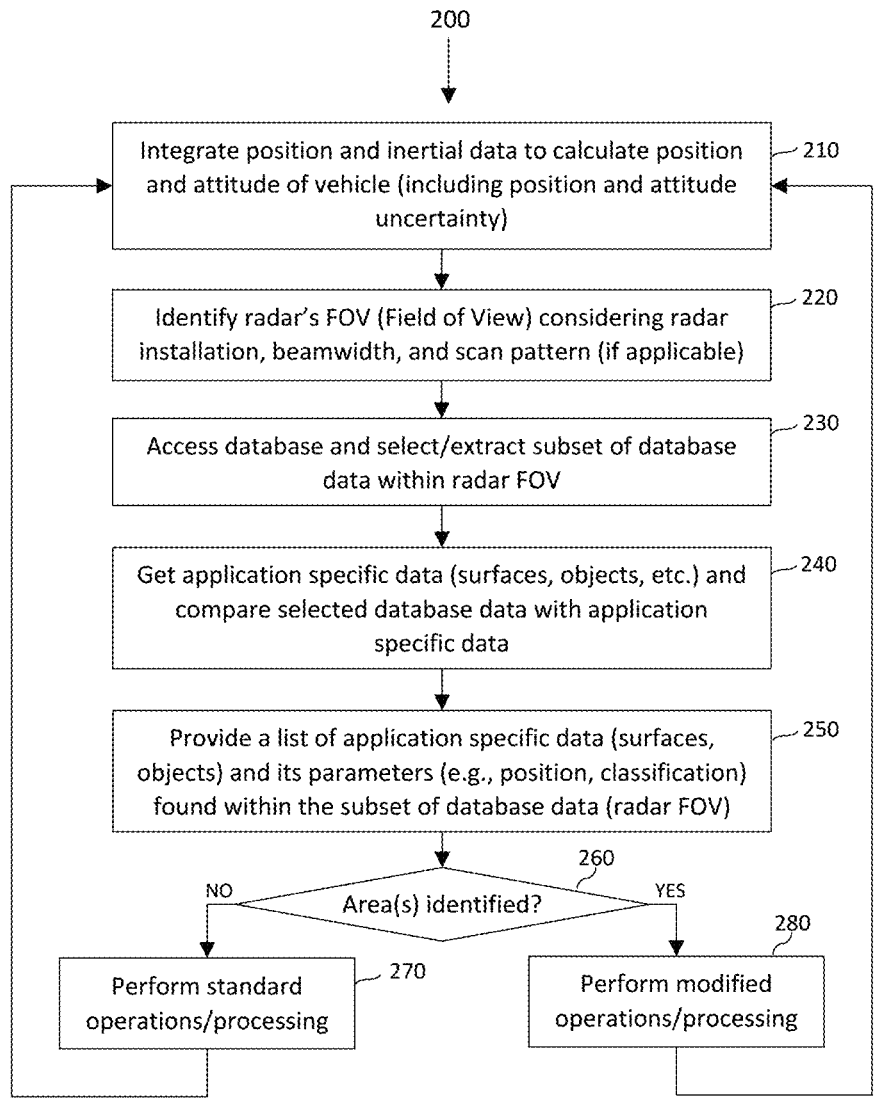
FIG. 2 is a flow diagram of a method for identifying undesired surfaces and/or objects using database information, according to one implementation.

FIG. 2 is a flow diagram of a method 200, which can be performed by application module 130 to identify undesired surfaces and/or objects using database information, according to one implementation. First, method 200 integrates position and inertial data to calculate a position, attitude, and position and attitude uncertainty of the vehicle (block 210). The uncertainty will influence the FOV that can be considered in application, as the FOV would not be a simple single cone projection on ground, but a series of cones approximated by geometric shape with ground projection such as an ellipse. The method 200 then identifies the radar's FOV, and possible radar's FOV variation due to vehicle position and attitude uncertainty, considering the radar installation, radar beamwidth, and scan pattern (if applicable)(block 220). The method 200 accesses the surface database and selects/extracts a subset of database data within the radar FOV (block 230). The method 200 gets application specific data (e.g., surfaces, objects, etc.) and compares selected database data with the application specific data (block 240). The method 200 provides a list of application specific data (surfaces, objects) and its parameters (e.g., position, classification) found within a subset of database data (radar FOV) (block 250).

The method 200 then determines whether one or more areas are identified as having undesired surfaces and/or objects (block 260). If no areas are identified, method 200 performs standard operations and/or processing (block 270) and returns to block 210 to repeat the above steps. If one or more areas are identified, method 200 performs modified operations and/or processing (block 280), which are described in further detail hereafter. The method 200 then returns to block 210 to repeat the above steps.

In one example to identify undesired surfaces and/or objects using database information, position and inertial data are processed to obtain platform (e.g., helicopter, UAV) position and attitude. Based on the platform position, radar installation, radar beam width, and other parameters, a radar FOV is determined. Data for the determined radar FOV are extracted from the surface database. Based on the desired application (e.g., radar altimeter, Doppler navigation), surfaces and objects (application specific data) to be considered are specified (different surfaces and objects might be considered by different applications) and searched within the data extracted from the surface database. A list of any found data is then created. If the list is empty, standard operations and/or processing are executed. Otherwise, modified operations and/or processing are executed. Further details for the modified operations and/or processing are shown in FIGS. 3 and 4.

Figure 3:
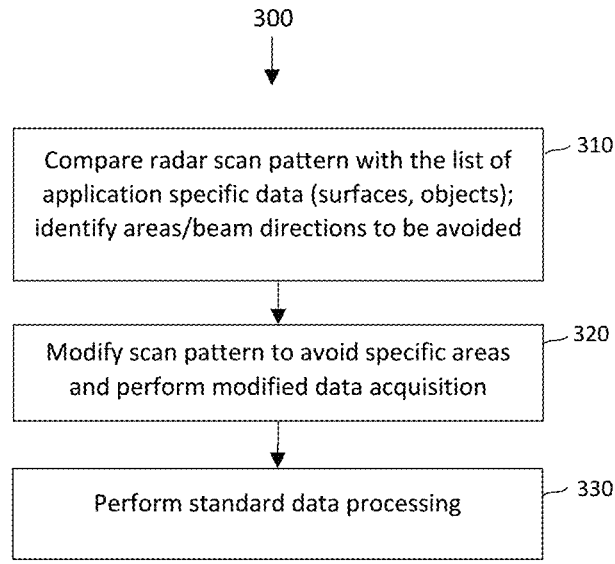
FIG. 3 is a flow diagram of an exemplary method of performing modified radar scanning using the system of FIG. 1.

In particular, FIG. 3 is a flow diagram of processing logic for a method 300, which can be performed by application module 130 of system 100 to perform modified scanning, according to one implementation. The method 300 compares a radar scan pattern with the list of application specific data (surfaces, objects), and identifies areas/beam directions to be avoided (block 310). The method 300 modifies the scan pattern to avoid specific areas and performs modified data acquisition (block 320). The method 300 then performs standard data processing (block 330).

For example, if application specific data (e.g., surface type, terrain, obstacles, objects) is found within the surface database data for the radar FOV, a modified scan control can be applied to identified areas. The directions of radar beams that cover the identified areas with application specific data are identified. A modified scan logic is then applied to avoid the identified areas. The data provided by the radar sensor are then processed by standard protocols.

Figure 4:
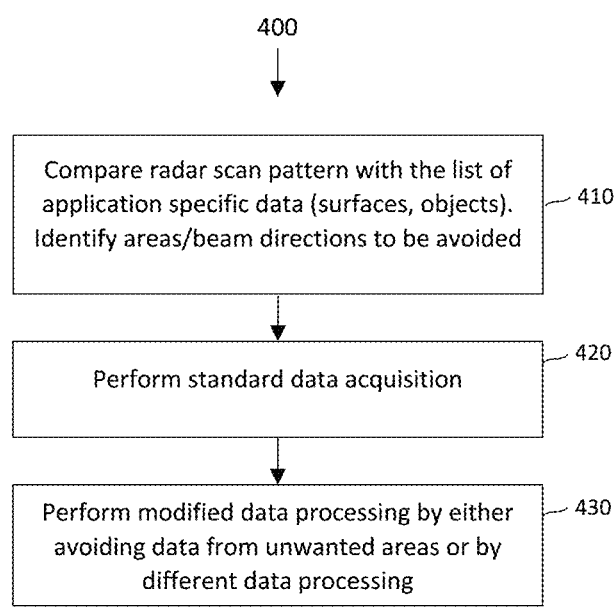
FIG. 4 is a flow diagram of an exemplary method of performing modified data processing using the system of FIG. 1.

FIG. 4 is a flow diagram of processing logic for a method 400, which can be performed by application module 130 of system 100 to perform modified processing, according to one implementation. The method 400 compares a radar scan pattern with the list of application specific data (surfaces, objects), and identifies areas/beam directions to be avoided (block 410). The method 400 performs a standard data acquisition process (420). The method 400 then performs modified data processing by either avoiding data from unwanted areas, or by different data processing (block 430). For example, different processing methods and/or parameters can be used, or avoiding or filtering radar data from the one or more ground surface areas to be avoided can be employed.

In an example, if application specific data (e.g., surface type, terrain, obstacles, objects) is found within the surface database data for a radar FOV, a standard data acquisition without scan logic modification is performed (e.g., for radars with wide beam and/or without beam steering capability). The presence of application specific data within the radar FOV is addressed by modified data processing, which can include data omitting, filtering, labeling, selective processing, processing by different methods or using different processing parameters, or the like. The radar sensor might have a capability to identify or estimate the object's position within the radar FOV (e.g., position of object within the FOV in a time instance or period) or even within a narrow beam direction (e.g., position of object within a subarea or even within a corresponding beam direction in a time instance or period). This type of information can be used within the modified processing as well (e.g., to exclude related radar data such as specific detections, tracks, data from specific ranges, etc.).

The modified operations and processing depicted in FIGS. 3 and 4 can be applied independently, or their combination might be used in some implementations.

FIGS. 5A-5D are schematic illustrations of an exemplary radar scanning operation, using a radar sensor with narrow beam and beam steering mechanism, for which the present systems and methods can be implemented, such as the system of FIG. 1.

In a first time instance or period 510, shown in FIG. 5A, an ownship/moving platform 511 (e.g., helicopter, airplane, UAV, etc.) has a radar with a FOV 512 that includes multiple subareas 513, corresponding to individual beam directions (i.e., areas irradiated by a radar beam steered into specific directions). In a second time instance or period 520, depicted in FIG. 5B, ownship/moving platform 511 has moved, such that the radar FOV 512 now covers a subarea section 523 including an undesired object 525 (e.g., house, building, etc.). In a third time instance or period 530, shown in FIG. 5C, the radar FOV 512 still covers subarea 523 including undesired object 525. In a fourth time instance or period 540, illustrated in FIG. 5D, the radar FOV 512 no longer covers the subarea with undesired object 525.

The present approach can be used in the above radar scanning operation of FIGS. 5A-5D to avoid undesired object 525 so as to, for example, keep a stable and smooth radar-based radio altimeter output, which is needed for navigation hybridization/aiding to increase primary navigation solution accuracy and integrity.

FIGS. 6A and 6B are schematic illustrations of an exemplary radar scanning operation, using a radar sensor with wide beam and without beam steering capability, for which the present systems and methods can be implemented. In a first time instance or period 610, shown in FIG. 6A, an ownship/moving platform 612 (e.g., helicopter, airplane, UAV, etc.) has a radar with a FOV 614 that is determined by a wide radar beam (area irradiated by radar beam). In a second time instance or period 620, depicted in FIG. 6B, ownship/moving platform 612 has moved, such that the radar FOV 614 determined by the wide radar beam irradiates an undesired object 622.

The present approach can be used in the radar scanning operation of FIGS. 6A-6B to remove/avoid data regarding undesired object 622 in post processing so as to keep a stable and smooth radar-based radio altimeter output.

FIGS. 7A and 7B are schematic illustrations of an exemplary radar scanning operation, using a radar sensor with narrow beam and beam steering mechanism for Doppler (velocity) navigation, for which the present systems and method can be implemented. In a first time instance or period 710, shown in FIG. 7A, a radar mounted on an ownship/moving platform 712 uses four radar beams 714 to provide data for Doppler navigation algorithms. In a second time instance or period 720, depicted in FIG. 7B, ownship/moving platform 712 has moved, and four beams 722 with modified directions are used (instead of original beams 714) to avoid a subarea 724 where an undesired object 726 has been identified.

The present approach can be used in the radar scanning operation of FIGS. 7A and 7B to avoid specific surfaces or objects such as undesired object 726 so as to, for example, avoid extremely diffuse surfaces (to ensure sufficient returned signal power) and objects such as trees (to avoid Doppler fluctuation caused by the movement of leaves and branches).

Figure 8:
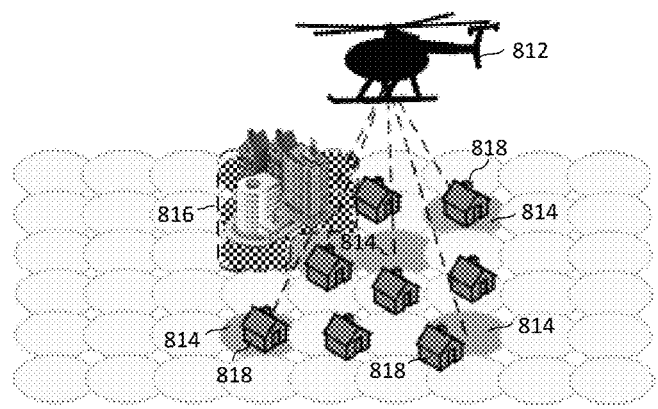
FIG. 8 is a schematic illustration of an exemplary radar scanning operation in a complex environment, using a radar sensor with narrow beam and beam steering mechanism, for which the system of FIG. 1 can be implemented.

FIG. 8 is a schematic illustration of an exemplary radar scanning operation in a complex (e.g., urban) environment, using a radar sensor with a narrow beam and beam steering mechanism, for which the present systems and method can be implemented. A radar mounted on an ownship/moving platform 812 uses multiple radar beams 814 to provide data for a desired application (e.g., altimeter, Doppler navigation, terrain aided navigation), to avoid an area 816 with complex objects/infrastructure, expected to have a significant impact on radar reading. At the same time, other objects 818 (expected to have less impact on radar reading) might not be considered for modified operations or processing.

The present approach can be used in the radar scanning operation of FIG. 8 to avoid specific surfaces or objects such as in area 816 so as to, for example, scan primarily areas not affecting (or not significantly affecting) radar reading for navigation purposes (e.g., trees, small buildings, etc.), while complex objects (e.g., dense built-up area with tall buildings) that reduce effective use of the radar are avoided (e.g., for UAM/UAV operations).

Figure 9:
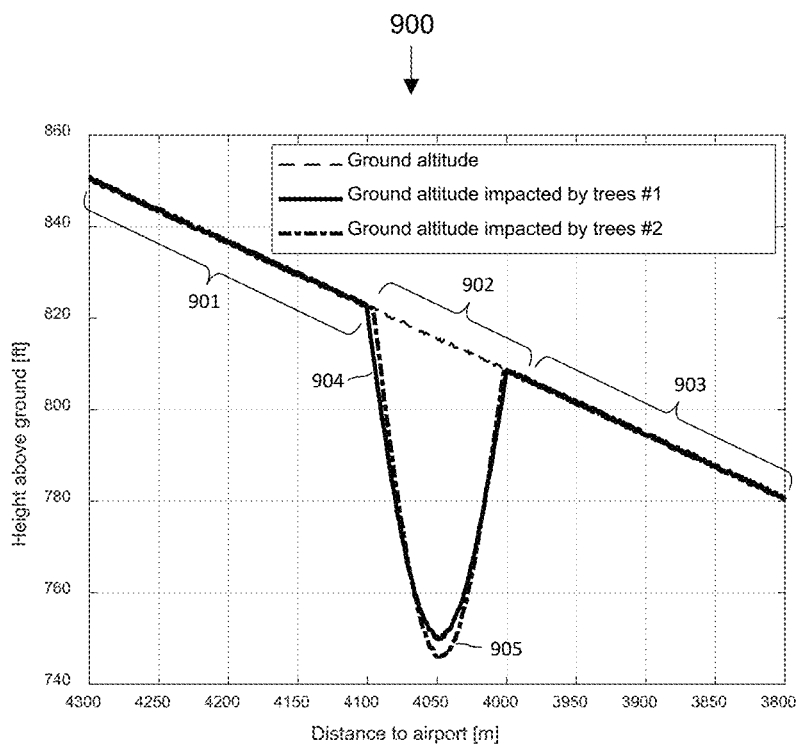
FIG. 9 is a graphical representation of an example of how ground altitude is impacted by a cluster of trees.

FIG. 9 is a graphical representation 900 of an illustrative example of how ground altitude is impacted by a cluster of trees. The graphical representation 900 shows a height above ground with respect to a distance to an airport. In this example, the ground altitude is provided by a radar altimeter during an approach operation of a platform such as an aircraft. The altitude reported by the radar altimeter corresponds to a ground altitude (901 and 903) when the surface below the moving platform within a radar FOV is flat/without obstacles. An obstacle within the radar FOV (e.g., as illustrated in FIG. 6B—time instance or period 620) impacts the reported altitude. A modified altitude 904 or 905 is reported instead of a ground altitude 902. Moreover, the repeatability of altitude measurements (and of range error statistics) might be limited due to various objects including seasonal variation of natural objects (e.g., trees/forest). This variation is also illustrated in FIG. 9, where the ground altitude 904 reported during a first approach differs from the ground altitude 905 reported during a second approach with the same flight trajectory, but in a different season, because of a seasonal variation of trees.

The processing units and/or other computational devices used in systems and methods described herein may be implemented using software, firmware, hardware, or appropriate combinations thereof. The processing unit and/or other computational devices may be supplemented by, or incorporated in, a general-purpose processor (GPP), digital signal processor (DSP), or in other similar devices, as well as in application-specific integrated circuits (ASICs), or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a system comprising: a radar sensor unit onboard a vehicle, the radar sensor unit comprising: at least one antenna; a transmitter operatively coupled to the at least one antenna, the transmitter configured to transmit one or more radar beams toward a surface through the at least one antenna; a receiver operatively coupled to the at least one antenna, the receiver configured to receive a reflected return signal of the transmitted one or more radar beams through the at least one antenna; and at least one processor unit operatively coupled to the transmitter and the receiver, wherein the at least one processor unit hosts a plurality of modules comprising: a scanning control module operative to send a control signal to the transmitter, to the receiver, or to both the transmitter and the receiver, to generate one or more radar beams; and a signal processing module configured to receive a reflected signal from the receiver to generate radar data; an application module stored onboard the vehicle; and a ground surface database stored onboard the vehicle or at a ground location; wherein the application module is operative to access information from the ground surface database, access position and attitude data of the vehicle, access position and attitude uncertainty data of the vehicle, access radar installation data, and access radar data from the signal processing module; identify one or more ground surface areas to be avoided based on the information from the ground surface database, the position and attitude of the vehicle, the position and attitude uncertainty of the vehicle, and the radar installation data; and perform modified radar operations and/or processing when the one or more ground surface areas to be avoided are within a radar field of view (FOV) of the radar sensor unit.

Example 2 includes the system of Example 1, wherein the modified radar operations and/or processing comprise at least one of: outputting a control signal to the scanning control module to modify a scan pattern of the one or more radar beams to avoid scanning the one or more ground surface areas; or using different processing methods and/or parameters, or avoiding or filtering radar data from the one or more ground surface areas to be avoided.

Example 3 includes the system of any of Examples 1-2, wherein the at least one antenna is configured to provide beam steering for the one or more radar beams.

Example 4 includes the system of any of Examples 1-2, wherein the at least one antenna is configured to provide a fixed beam direction for the one or more radar beams.

Example 5 includes the system of any of Examples 1-4, wherein the at least one processor unit comprises a radar signal processing and control module that is hosted by the radar sensor unit.

Example 6 includes the system of Example 5, wherein the application module is hosted by the radar signal processing and control module.

Example 7 includes the system of any of Examples 1-5, wherein the application module is hosted by an onboard computing platform or storage external to the radar sensor unit.

Example 8 includes the system of any of Examples 1-5, wherein the application module is distributed to both the radar sensor unit, and an onboard computing platform or storage external to the radar sensor unit.

Example 9 includes the system of any of Examples 1-8, wherein the application module comprises a radar altimeter application, a Doppler navigation application, or a terrain aided navigation application.

Example 10 includes the system of any of Examples 1-9, wherein the ground surface database is hosted by the radar sensor unit.

Example 11 includes the system of any of Examples 1-9, wherein the ground surface database is hosted by an onboard computing platform or storage external to the radar sensor unit.

Example 12 includes the system of any of Examples 1-9, wherein the ground surface database is distributed to both the radar sensor unit, and an onboard computing platform or storage external to the radar sensor unit.

Example 13 includes the system of any of Examples 1-9, wherein the ground surface database is hosted by a ground station.

Example 14 includes the system of any of Examples 1-13, wherein the application module is operative to access a position and attitude of the vehicle, and radar installation data.

Example 15 includes the system of any of Examples 1-14, wherein the vehicle is an aircraft.

Example 16 includes a method comprising: providing a radar sensor unit onboard a vehicle; calculating a position and attitude of the vehicle based on position and inertial data; calculating a position and attitude uncertainty of the vehicle based on the position and inertial data; identifying a radar field of view (FOV) for the radar sensor unit; accessing a surface database to select a subset of database data within the radar FOV; obtaining application specific data related to surfaces and/or objects; comparing the subset of database data with the application specific data; providing a list of application specific data and its parameters found within the subset of database data; comparing a radar scan pattern of the radar sensor unit with the list of application specific data to identify any surface areas and/or beam directions to be avoided; and if one or more surface areas and/or beam directions to be avoided are identified, performing modified radar operations and/or processing.

Example 17 includes the method of Example 16, wherein the modified operations and/or processing comprise: modifying the radar scan pattern to avoid the identified one or more surface areas and/or beam directions; performing a corresponding radar data acquisition; and performing standard radar data processing.

Example 18 includes the method of Example 16, wherein the modified operations and/or processing comprise: performing a standard radar data acquisition; and performing modified data processing by using different processing methods and/or parameters, or by avoiding or filtering data from the one or more surface areas and/or beam directions.

Example 19 includes the method of Example 16, wherein the modified operations and/or processing comprise: modifying the radar scan pattern to avoid the identified one or more surface areas and/or beam directions; performing a corresponding radar data acquisition; performing standard radar data processing; performing a standard radar data acquisition; and performing modified data processing by using different processing methods and/or parameters, or by avoiding or filtering data from the one or more surface areas and/or beam directions.

Example 20 includes the method of any of Examples 16-19, wherein the vehicle comprises an airplane, a helicopter, an unmanned aerial vehicle (UAV), or an urban air mobility (UAM) vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:
   a radar sensor unit onboard a vehicle, the radar sensor unit comprising:
      at least one antenna;
      a transmitter operatively coupled to the at least one antenna, the transmitter configured to transmit one or more radar beams toward a surface through the at least one antenna;
      a receiver operatively coupled to the at least one antenna, the receiver configured to receive a reflected return signal of the transmitted one or more radar beams through the at least one antenna; and
      at least one processor unit operatively coupled to the transmitter and the receiver, wherein the at least one processor unit hosts a plurality of modules comprising:
         a scanning control module operative to send a control signal to the transmitter, to the receiver, or to both the transmitter and the receiver, to generate one or more radar beams; and
         a signal processing module configured to receive a reflected signal from the receiver to generate radar data;
   an application module stored onboard the vehicle; and
   a ground surface database stored onboard the vehicle or at a ground location;
   wherein the application module is operative to:
      access information from the ground surface database, access position and attitude data of the vehicle, access position and attitude uncertainty data of the vehicle, access radar installation data, and access radar data from the signal processing module;
      identify one or more ground surface areas that are expected to provide a radar measurement with reduced reliability, based on the information from the ground surface database, the position and attitude of the vehicle, the position and attitude uncertainty of the vehicle, and the radar installation data; and
      perform modified radar operations and/or processing when the one or more ground surface areas expected to provide the radar measurement with reduced reliability are within a radar field of view (FOV) of the radar sensor unit.

2. The system of claim 1, wherein the modified radar operations and/or processing comprise at least one of:
   outputting a control signal to the scanning control module to modify a scan pattern of the one or more radar beams to not steer the one or more radar beams to the one or more ground surface areas; or
   using different processing methods and/or parameters, or not using or filtering radar data from the one or more ground surface areas expected to provide the radar measurement with reduced reliability.

3. The system of claim 1, wherein the at least one antenna is configured to provide beam steering for the one or more radar beams.

4. The system of claim 1, wherein the at least one antenna is configured to provide a fixed beam direction for the one or more radar beams.

5. The system of claim 1, wherein the at least one processor unit comprises a radar signal processing and control module that is hosted by the radar sensor unit.

6. The system of claim 1, wherein the identification of the one or more ground surface areas expected to provide the radar measurement with reduced reliability is determined using information about obstacles and objects, including seasonal variation of natural objects, which is contained in the ground surface database.

7. The system of claim 1, wherein the application module is hosted by an onboard computing platform or storage external to the radar sensor unit.

8. The system of claim 1, wherein the application module is distributed to both the radar sensor unit, and an onboard computing platform or storage external to the radar sensor unit.

9. The system of claim 1, wherein the application module comprises a radar altimeter application, a Doppler navigation application, or a terrain aided navigation application.

10. The system of claim 1, wherein the ground surface database is hosted by the radar sensor unit.

11. The system of claim 1, wherein the ground surface database is hosted by an onboard computing platform or storage external to the radar sensor unit.

12. The system of claim 1, wherein the ground surface database is distributed to both the radar sensor unit, and an onboard computing platform or storage external to the radar sensor unit.

13. The system of claim 1, wherein the ground surface database is hosted by a ground station.

14. The system of claim 1, wherein the application module is operative to access a position and attitude of the vehicle, and radar installation data.

15. The system of claim 1, wherein the vehicle is an aircraft.

16. A method comprising:
   transmitting one or more radar beams from a radar sensor unit onboard a vehicle toward a surface in a radar scan pattern;
   receiving in the radar sensor unit a reflected return signal of the transmitted one or more radar beams;
   calculating a position and attitude of the vehicle based on position and inertial data;

calculating a position and attitude uncertainty of the vehicle based on the position and inertial data;

identifying a radar field of view (FOV) for the radar sensor unit;

accessing a surface database to select a subset of database data within the radar FOV;

obtaining application specific data related to surfaces and/or objects;

comparing the subset of database data with the application specific data;

providing a list of application specific data and its parameters found within the subset of database data;

comparing the radar scan pattern of the radar sensor unit with the list of application specific data to identify any surface areas and/or beam directions expected to provide a radar measurement with reduced reliability; and if one or more surface areas and/or beam directions expected to provide the radar measurement with reduced reliability are identified, performing modified radar operations and/or processing.

17. The method of claim 16, wherein the modified operations and/or processing comprise:

modifying the radar scan pattern to not steer the one or more radar beams to the identified one or more surface areas and/or beam directions;

performing a corresponding radar data acquisition; and performing standard radar data processing.

18. The method of claim 16, wherein the modified operations and/or processing comprise:

performing a standard radar data acquisition; and performing modified data processing by using different processing methods and/or parameters, or by not using data or filtering data from the one or more surface areas and/or beam directions.

19. The method of claim 16, wherein the modified operations and/or processing comprise:

modifying the radar scan pattern to not steer one or more radar beams to the identified one or more surface areas and/or beam directions;

performing a corresponding radar data acquisition;

performing standard radar data processing;

performing a standard radar data acquisition; and performing modified data processing by using different processing methods and/or parameters, or by not using data or filtering data from the one or more surface areas and/or beam directions.

20. The method of claim 16, wherein the vehicle comprises an airplane, a helicopter, an unmanned aerial vehicle (UAV), or an urban air mobility (UAM) vehicle.

* * * * *